Patented July 30, 1940

2,209,876

UNITED STATES PATENT OFFICE 2,209,876

OIL SOLUBLE ESTERS OF PHENYL-THIOARSONITES

Arthur James Ewins, Romford, and George Newbery, Hutton, England, assignors to May & Baker, Limited, London, England, a company of Great Britain No Drawing. Application May 4, 1937, Serial No. 140,602. In Great Britain May 9, 1936

4 Claims. (Cl. 260—440)

The present invention relates to therapeutically active organic compounds of arsenic.

Therapeutically active organic compounds of arsenic have hitherto been employed exclusively in aqueous solution. Such solutions are for the most part injected intravenously, which results in a very rapid elimination of the greater part of the drug injected, thereby reducing its potential efficacy. In the comparatively few cases in which such solutions are employed by subcutaneous or intramuscular injection, elimination is also rapid though slower than in the first-mentioned method of administration. In the case of organic compounds of bismuth the employment of preparations soluble in oily media has shown itself to be of value as a means of obtaining moderately slow absorption and prolonged therapeutic effect and of administering products which it would be impossible otherwise to employ as therapeutic agents.

The object of the present invention is to obtain oil-soluble organic compounds of arsenic which have therapeutic possibilities in the treatment of diseases such as syphilis and yaws.

According to this invention such oil-soluble organic compounds of arsenic may be obtained by the condensation of aryl- or substituted aryl-arsenoxides or -dihalogen arsines containing hydroxyl, amino or acetylamino groups as substituents in the aryl nucleus with aliphatic esters of mercapto acetic acid or its α-substituted derivative, thiomalic acid, such, for example, as dibutyl mercapto-succinate

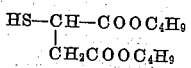

In order to obtain sufficient solubility in oil in the resulting compound, the ester used should contain a total of more than 6 carbon atoms so that the use of the methyl ester of thiomalic acid and the methyl to butyl esters of thiolacetic acid is not included in this invention. The resulting products which may be represented by the general formula

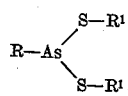

in which R represents a member of the group comprising an aryl or substituted aryl radical and R¹ is an ester of a carboxyl-alkyl-radicle which may contain substituent groups are characterised by their solubility in non-hydroxylic solvents, e. g. benzene, chloroform, etc. and in particular by their solubility in vegetable oils or other esters suitable as media for therapeutic use by injection.

The following examples illustrate how the invention may be carried out in practice, but it is to be understood that the invention is in no way limited to the details given in these examples:

Example 1

112 grams of para acetamino phenylarsenoxide were added to a mixture of 175 cc. of amyl mercaptoacetate and 500 cc. of absolute alcohol. On warming rapid solution was effected and after cooling addition of water caused the separation of the oily product. The latter was dissolved in chloroform, the solution dried over exsiccated sodium sulphate and the solvent removed by distillation. The residue was once more dissolved in chloroform, filtered to remove any insoluble impurity which had separated and the solvent re-evaporated.

The residual oil which consisted of bis-(carboamyloxy) methyl 4-acetamido phenyl thioarsonite

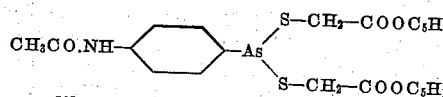

was readily soluble in organic solvents and in ethyl oleate.

Example 2

60 grams of 3-acetamido-4-hydroxyphenyl arsenoxide were suspended in a mixture of 140 grams of dibutyl mercaptosuccinic ester and 300 cc. of ethyl alcohol. Solution was obtained as before and an oil separated on the addition of water. The oil was washed with dilute spirit and taken up in benzene. The benzene solution after being dried and evaporated yielded the required bis(1,2-di(carbobutoxy)ethyl-3' - acetamido 4' - hydroxy phenyl thioarsonite

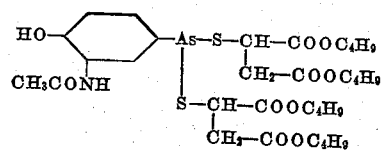

as a slightly yellow viscous oil readily soluble in organic solvents and soluble to a considerable extent in olive oil.

Example 3

200 grams of 2-hydroxy-4-acetamido-phenyl arsenoxide were added to a mixture of 500 grams of butylmercaptosuccinate dissolved in 1 litre of absolute alcohol. The resulting solution was filtered and diluted with an equal volume of water.

The oil which separated was taken up in chloroform, washed with 50% spirit to remove excess of unchanged ester and finally with water. The chloroform solution was dried over anhydrous sodium sulphate and on removal of solvent the required bis(1,2-di(carbobutoxy)ethyl) 4'- acetamido-2'-hydroxyphenyl thioarsonite

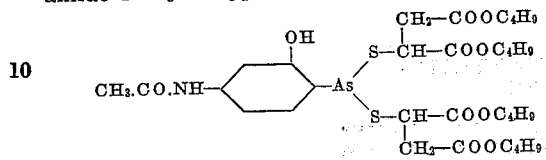

remained as a colourless oil, insoluble in water but readily soluble in organic solvents. This oil may be dissolved in ethyl oleate or other suitable solvent for use therapeutically by injection.

*Example 4*

100 grams of 2-hydroxy-5-acetamido-phenylarsenoxide were dissolved in a mixture of 250 cc. dibutyl mercapto succinic ester and 500 cc. absolute alcohol, with slight warming if necessary, and the oily product thrown out by the addition of a little water. The oily product was dissolved in chloroform and the solution dried over anhydrous sodium sulphate. On evaporation of the solvent bis(1,2-di(carbobutoxy)ethyl) 5'-acetamido 2' hydroxy phenylthioarsonite

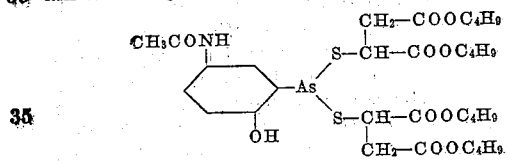

remained as a nearly colourless oil readily soluble in organic solvents, in ethyl oleate and to a lesser degree in certain natural vegetable oils such, for example, as chaulmoogra oil.

*Example 5*

300 grams of 2-hydroxy-5-amino-phenyldichlorarsine were added to 500 grams of dibutyl mercapto succinate in a litre of absolute alcohol. Rapid solution ensued with some evolution of heat. After a few minutes further heating on a steam-bath, the mixture was cooled and diluted with an equal volume of water. The lower oily layer was separated, taken up in chloroform and washed with dilute sodium carbonate solution till free from acid and finally with water till free from alkali. The chloroform solution was then dried over anhydrous sodium sulphate, and the solvent removed when the required bis (1,2-di(carbobutoxy)ethyl) 5'-amino 2'-hydroxyphenylthioarsonite

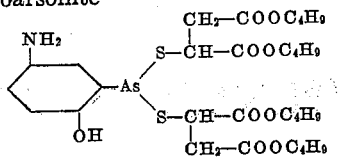

remained as a yellow oil which was readily soluble in organic solvents and in ethyl oleate.

What we claim and desire to secure by Letters Patent is:

1. Thioarsonite derivatives soluble in oil and in non-hydroxylic solvents, said thioarsonite derivatives having the general formula:

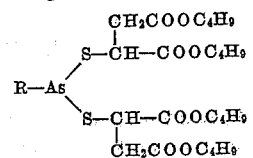

in which R represents a phenyl radicle substituted from the group of substituents consisting of hydroxyl, amino and acetylamino.

2. The oil-soluble arsenic compound bis(1,2-di(carbobutoxy)ethyl)4'- acetamido 2'- hydroxy phenyl thioarsonite

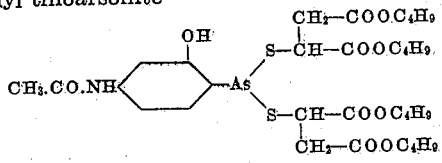

3. The oil-soluble arsenic compound bis(1,2-di(carbobutoxy) ethyl) 5'-acetamido 2' hydroxyphenylthioarsonite

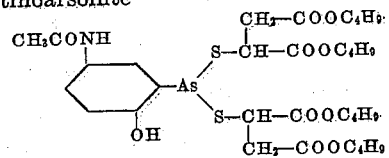

4. The oil soluble arsenic compound bis(1,2-di(carbobutoxy)ethyl)-5'- amino 2'- hydroxyphenylthioarsonite

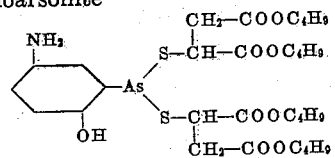

ARTHUR JAMES EWINS.
GEORGE NEWBERY.